United States Patent [19]

Shilander et al.

[11] 4,314,629
[45] Feb. 9, 1982

[54] POWER ROLLER ACCUMULATING CONVEYOR

[75] Inventors: Frank R. Shilander, Euclid; Gyorgy Kiss, Chesterland, both of Ohio

[73] Assignee: La Salle Machine Tool, Inc., Troy, Mich.

[21] Appl. No.: 108,688

[22] Filed: Dec. 31, 1979

[51] Int. Cl.³ .................. B65G 45/02; B65G 13/06
[52] U.S. Cl. .................. 198/500; 198/781; 198/789; 64/30 E; 64/30 LB
[58] Field of Search ............ 198/500, 780, 781, 789, 198/791; 308/DIG. 5; 64/30 E, 30 LB

[56] References Cited

U.S. PATENT DOCUMENTS

| | | | |
|---|---|---|---|
| 2,421,925 | 6/1947 | Cooley | 64/30 LB |
| 2,602,536 | 7/1952 | Eggleston | 198/789 |
| 2,609,917 | 9/1952 | Gotthardt | 198/789 |
| 2,860,766 | 11/1958 | Welter | 198/780 |

FOREIGN PATENT DOCUMENTS

| | | | |
|---|---|---|---|
| 2718737 | 3/1978 | Fed. Rep. of Germany | 198/780 |
| 458829 | 12/1936 | United Kingdom | 308/DIG. 5 |
| 533842 | 2/1941 | United Kingdom | 64/30 LB |

*Primary Examiner*—Jeffrey V. Nase
*Attorney, Agent, or Firm*—Olsen and Stephenson

[57] ABSTRACT

An accumulating conveyor comprising a frame on which a plurality of horizontally spaced apart power rollers are positioned for propelling articles along the conveyor. Each power roller includes a tubular metal roller member terminating at opposite ends and having an axial passageway extending between and through its opposite ends. A motor driven drive shaft which is mounted on the frame extends through the roller member's passageway and supports a friction drive member formed of powdered metal and impregnated with a lubricant. The friction drive member is positioned in the passageway in frictional engagement with the roller member and rotates conjointly with the drive shaft. Rotation of the drive shaft is transmitted by the friction drive member to propel the articles along the conveyor. When the movement of the article is restrained, the friction drive member slips in the passageway relative to the roller member so that the roller member remains motionless.

3 Claims, 5 Drawing Figures

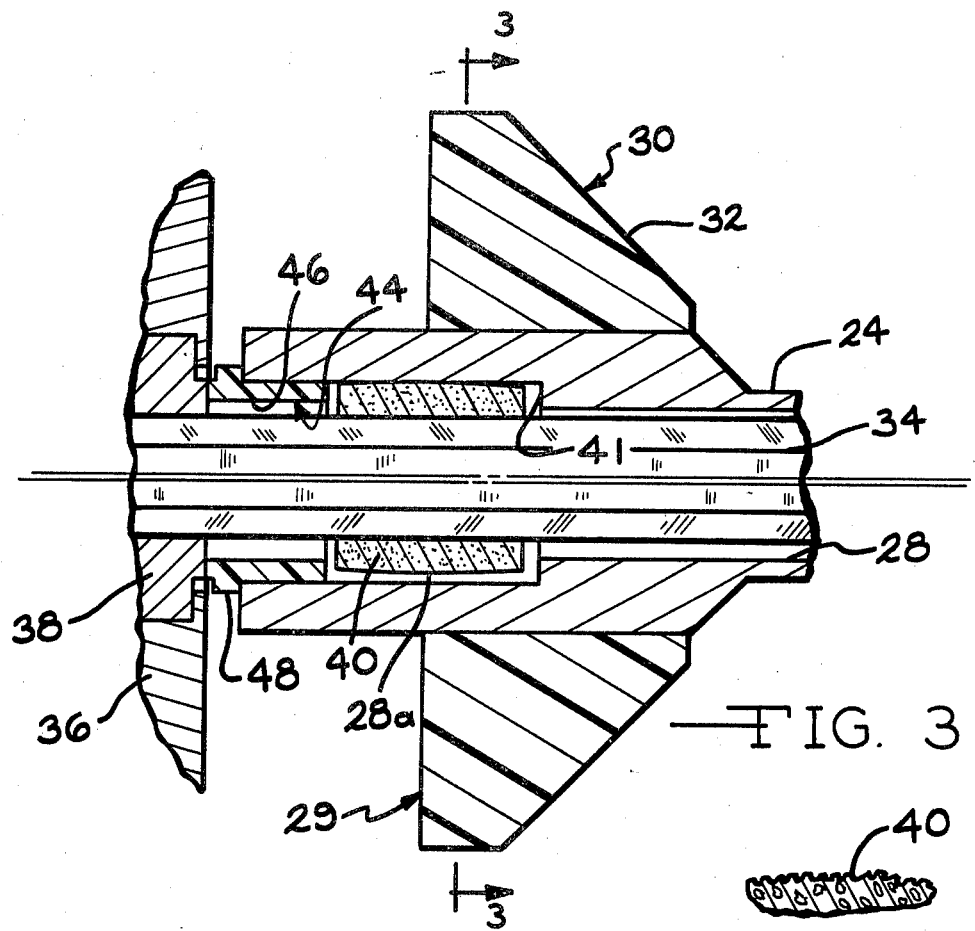
FIG. 3
FIG. 5
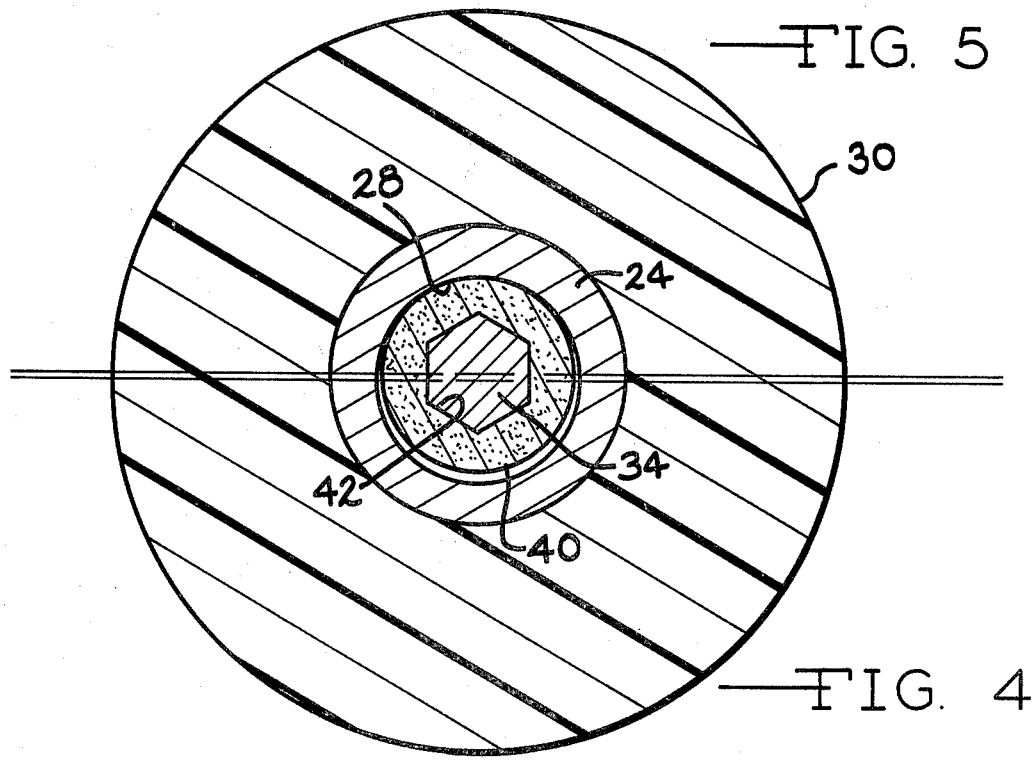
FIG. 4

POWER ROLLER ACCUMULATING CONVEYOR

BACKGROUND OF THE INVENTION

The present invention relates generally to an accumulating conveyor, and more particularly, to an accumulating conveyor employing power or live rollers for propelling articles along the conveyor.

A wide variety of accumulating conveyors are available which perform adequately. Nevertheless, these accumulating conveyors tend to be complex and are difficult to maintain and service, especially when worn or broken parts need to be replaced. It is the general object of this invention, therefore, to provide a power roller accumulating conveyor using a friction drive employing drive members formed from powdered metal and having a lubricant impregnated therein. It is a further object of this invention to provide a power roller accumulating conveyor whose components are easily assembled and disassembled.

SUMMARY OF THE INVENTION

The present invention provides an accumulating conveyor having a frame on which a plurality of side-by-side power or live rollers are rotatably mounted and are frictionally driven to propel articles along the conveyor. Each power roller includes a tubular metal roller member having a passageway extending between and through its ends to accommodate a drive shaft. The drive shaft extends beyond the ends of the roller member and is rotatably mounted on the frame.

A pair of friction drive members are removably mounted on the drive shaft for conjoint movement therewith and are positioned in the passageway of the roller member to transmit the rotary movement of the drive shaft to the roller member to propel the articles along the conveyor. Each frictional drive member is formed from a powdered metal resulting in a porous composition that is impregnated with a lubricant. Employment of these friction drive members produces a coefficient of friction between the friction drive members and the roller members that enables the friction drive members to slip in the passageway relative to the roller member when the articles on the conveyor are restrained from movement. The roller member thus remains stationary relative to the article thereby avoiding any damage to the article and wear to the roller.

End cap members, formed of a synthetic polymer with a dry lubricating agent or of a powdered metal impregnated with lubrication, are mounted on each roller member at its opposite ends. The end cap members project beyond the ends of the roller member and engage the frame to prevent back and forth axial movement of the power roller between the frame and to minimize the frictional resistance between the roller member and the frame. The end cap members each have an internal opening sufficiently large to enable the drive shaft to extend through the end cap member and remain in a clearance relationship therewith so that the roller members and the end cap members can rotate with respect to the drive shafts. The friction drive members and the end cap members are relatively inexpensive and are easily and quickly replaced.

Further objects, features and advantages of the present invention will become apparent from a consideration of the following description when taken in connection with the appended claims and the following drawing in which:

FIG. 3 is an enlarged fragmentary view of the power roller shown in FIG. 2;

FIG. 4 is a sectional view of the power roller in the present invention taken substantially from line 3—3 in FIG. 3; and FIG. 5 is an enlarged fragmentary sectional view of the friction drive member taken substantially from line 3—3 in FIG. 3.

Figure 1:
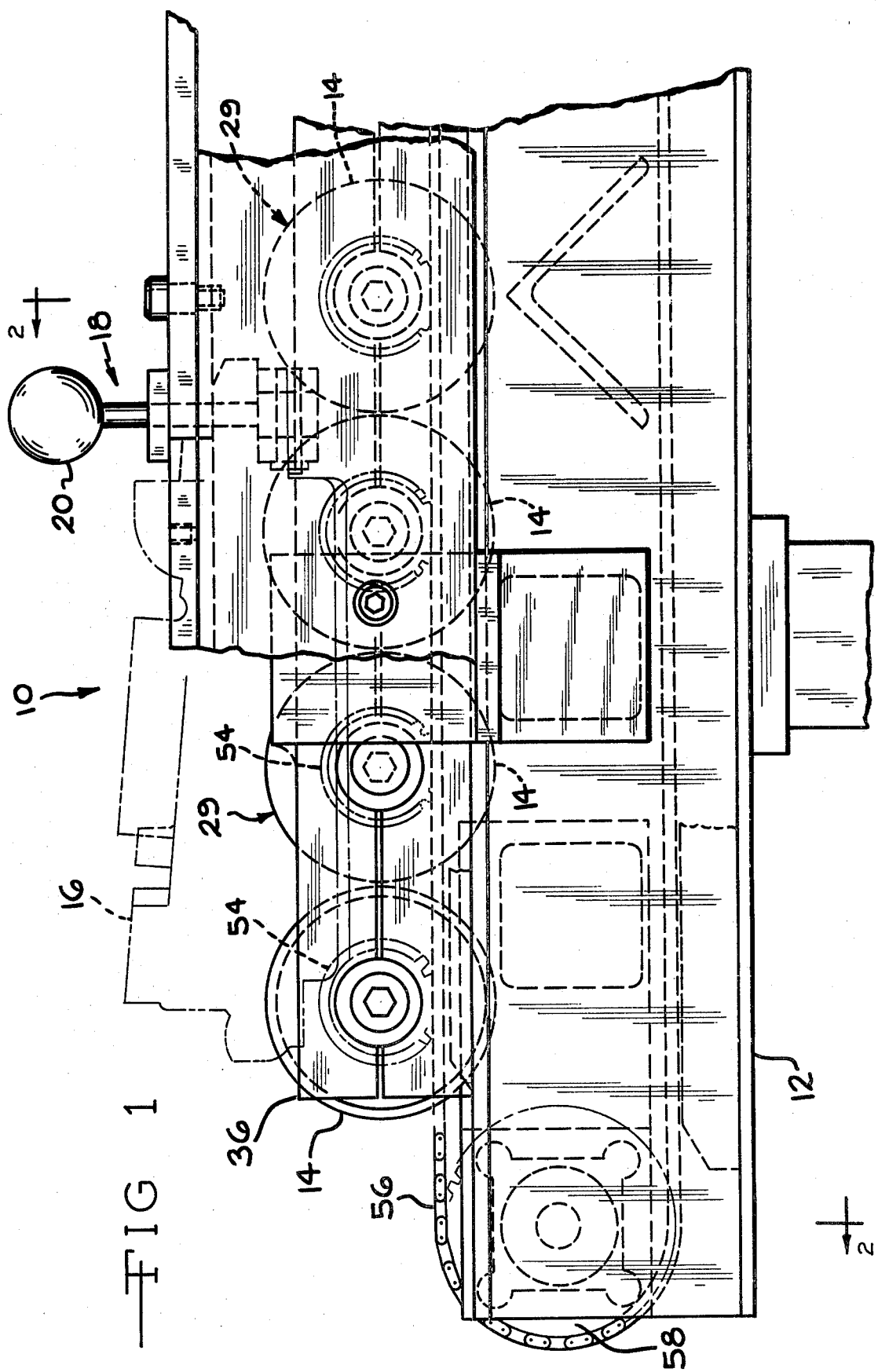
FIG. 1 is a side elevational view of a portion of the power roller accumulating conveyor of this invention.

Referring to the drawing, the accumulating conveyor of this invention, indicated generally at 10, is shown in FIG. 1 consisting of a frame 12 on which a plurality of power or live rollers 14 are rotatably mounted in generally horizontal side-by-side spaced apart positions. Each power roller 14 is frictionally driven to propel articles 16 such as an intake manifold along the conveyor 10.

Figure 2:
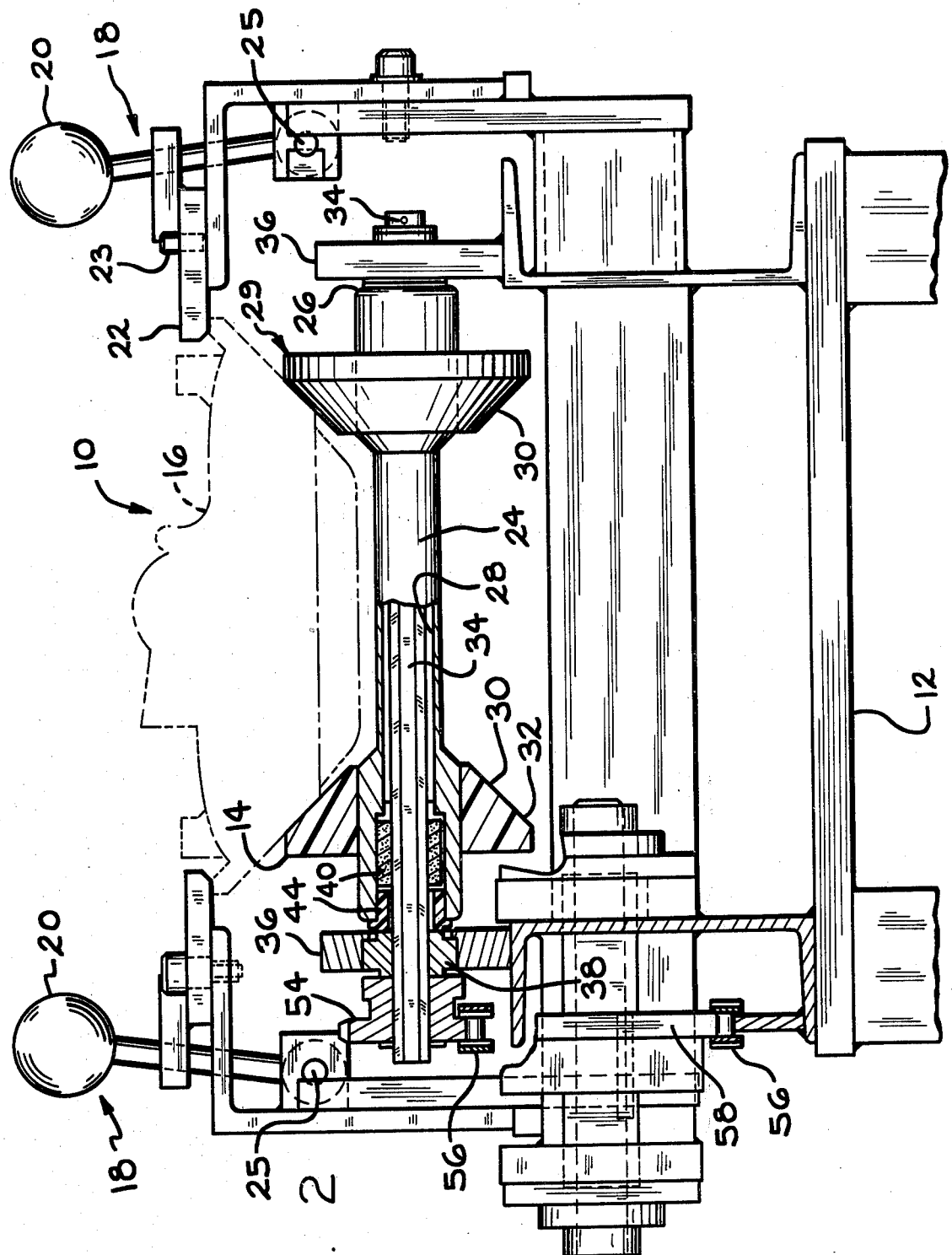
FIG. 2 is an end elevational view of the accumulating conveyor of this invention taken substantially from line 2—2 in FIG. 1 with portions shown in section and other portions broken away for the purpose of clarity.

Stop assemblies 18 each comprising a handle 20 and a stop member 22 are mounted on opposite sides of the frame 12 of the conveyor 10 as seen in FIGS. 1 and 2. The stop members 22 are pivotally mounted by pins 23 for pivotal movement in a horizontal plane about a vertical axis. The handles 20 are pivotally mounted on the frame 12 by pins 25. The stop assemblies 18 are manually operable to position the stop members 22 in interferring relationship with the articles 16 to prevent their forward movement along the conveyor 10. All following articles 16 behind the first article 16 which engages the stops 22 will then accumulate behind the article 16.

Each power roller 14 (FIGS. 2-4) consists of a hollow steel tube or roller member 24 having ends 26 and a longitudinal passageway or bore 28 extending between and through the ends 26. Article support means 29 is fixedly mounted on the roller member 24 for supporting the articles 16 during travel on the conveyor 10. The means 29 is illustrated as a pair of generally cone-shape members 30 having conically-shaped surfaces 32 which taper inwardly toward each other. The shape of the article support means 29 is determined by the particular configuration of the articles to be conveyed, the object being to support the articles directly on only the means 29, which is, therefore, preferably formed of a plastic material such as polyurethane or other suitable polymer.

The roller members 24 are each rotatably driven by an associated drive shaft 34 which is mounted by bearing assemblies 38 on parallel frame roller supports 36 which form a portion of the frame 12. The drive shaft 34 has a closed cross sectional configuration that is multi-sided and is shown in FIG. 4 as being hexagonal. The drive shaft 34 extends through the passageway 28 of the roller member 24 and beyond its ends 26 so that the drive shaft 34 can be mounted on the roller supports 36.

A pair of friction drive members 40 are mounted on the drive shaft 34 in an axially spaced apart relationship. Only one friction drive member is shown in FIG. 2; since the construction of the right-hand portion of the power roller 14 is essentially identical to the left-hand portion, the left-hand portion of the power roller 14 will be described in detail with material differences being noted. The friction drive member 40 is mounted on the drive shaft 34 for conjoint rotational movement therewith. It has an inner passageway 42 with a cross sectional configuration corresponding to but slightly larger than the multi-sided cross sectional configuration of the drive shaft 34. Thus, as seen in FIG. 4, the internal passageway 42 of the drive member 40 is hexagonal in shape. This construction enables the friction drive member 40 to be slidably fitted in the drive shaft 34 as well as being slidably removed therefrom. The multi-sided configuration of the drive shaft 34 and the internal passageway 42 of the friction drive member 40 prevents relative rotation between these two components and thus provides for their conjoint rotation.

The inner passageway 28 of the roller member 24 is generally circular in cross section like the outer shape of the friction drive member 40. However, the outside diameter of the friction drive member 40 is slightly smaller than the diameter of the passageway 28, as seen in FIG. 4, so that the friction drive member 40 does not bind in the passageway 28 and is easily positioned in and removed from the passageway 28. The portion 28a of the passageway 28 in which the friction drive member 40 is disposed is formed slightly larger than the internal portions of the passageway 28 so that a shoulder 41 is provided, preventing the inward creeping of the friction drive member 40.

Each friction drive member 40 is formed from a powdered metal. The particular sintering process used gives the friction drive member a porous quality as shown in FIG. 5. A suitable lubricating agent, preferably oil, is impregnated into the drive member 40 occupying the cavities among the metal particles. Consequently, the lubrication gives the friction drive member 40 a coefficient of friction at its surface which provides the desired action between the friction drive member 40 and the roller 24.

The coefficient of friction achieved between the drive members 40 and their associated metal roller members 24 is such that when the articles 16 are free to move along the conveyor 10, the rotation of each drive shaft 34 is transmitted to the roller members 24 and their associated support portions 30 by the friction drive members 40. However, when the movement of an article 16 is restrained, the frictional resistance between the article support means 29 and the article 16 is greater than the frictional resistance between the friction drive members 40 and the roller member 24 therefor. As a result, the friction drive members 40 slip in the passageways 28 relative to their associated roller member 24. In this situation, the use of the friction drive members 40 formed from powdered metal and impregnated with oil, or similar liquid lubricant, creates a unique interaction between the friction drive members 40 and the rollers 24. When the articles 16 are restrained from movement, the slippage of the drive members 40 in the roller members 24 creates heat which expands the oil in the powdered metal members 40 and causes some oil to escape from the porous material. This oil acts as a lubricant to the interface between members 40 and 24 and reduces or eliminates further heating. When the articles 16 start to move again, the frictional force is reduced, the interface cools off, and the oil is reabsorbed by the porous material from which the members 40 are formed.

End caps 44 are removably mounted on the roller members 24 at their opposite ends 26. Each cap 44 includes a cylindrical hollow body 46 having an outwardly projecting flange 48. The cylindrical body has an outer diameter slightly smaller than the diameter of the passageway portion 28a enabling it to be press-fitted into the passageway 28a with the flange 48 limiting its inward movement. Thus, the friction drive member 40 is positioned and retained between a shoulder 41 and an end cap member 44. Each cap member 44 projects beyond one end 26 of the roller member 24 and is formed from a synthetic polymer such as polyurethane with a dry lubricating agent such as disulfide being incorporated in the polyurethane. The end cap members 44 prevent the axial back and forth movement of the power rollers 14 between the end supports 36 and by virture of their composition they minimize the frictional resistance of the power rollers 14 when they rub against the frame supports 36. The end caps 44 can also be formed of powdered metal impregnated with a lubrication having a composition identical to the make-up of the friction drive members 40.

The end cap members 44 and the friction drive members 40 can easily be removed and replaced since they are slidably mounted to their operative positions. As a result, maintenance is reduced and the replacement of worn parts is quickly and easily accomplished with a minimum amount of skill.

The drive shaft 34 extends beyond the left roller support frame 36, as seen in FIG. 2, and receives a drive wheel in the form of a roller sprocket 54. The roller sprocket 54 has an internal opening with a hexagonal configuration so that it rotates conjointly with the drive shaft 34. Each roller sprocket 54 is engaged along its lower portion by a chain 56 driven by a drive sprocket 58. Thus, when the drive sprocket 58 is rotated all power rollers 14 are simultaneously rotated to propel the articles 16 along the conveyor 10 as the frictional resistance between the friction drive members 40 and the roller members 24 is sufficient to overcome the inertia of the articles 16.

In operation, assume that the stop assemblies 18 are actuated to position the stop members 22 in interfering relationship with the next advancing article 16. When the article 16 engages the stop members 22, the frictional resistance between the article 16 and the support means 29 is greater than the frictional resistance between the drive members 40 and the roller members 24. As a result, the roller members 24 will remain stationary while the drive shafts 34 and their roller members 40 slip in the passageway 28 relative to the roller member 24. As the following article 16 engages the first stationary article 16, the roller members 24 beneath it will also cease rotating and remain stationary while their associated friction drive members 40 and drive shafts 34 continue to rotate. Thus, damage to the articles 16 is avoided by stopping roller members 24 and their article support portions 30 when the articles 16 are allowed to accumulate.

From the above description, it can be seen that an improved accumulating conveyor is provided which uses powdered metal drive members impregnated with lubrication to transmit rotational movement to the power rollers to propel the articles along the conveyor. The friction drive members 40 and end caps 44 are inexpensive and are quickly and easily replaced thereby enabling the low cost manufacture and maintenance of the accumulating conveyor.

What is claimed:

1. A conveyor comprising a frame, a plurality of spaced apart power rollers positioned on said frame and operable to propel articles along said conveyor, each of said power rollers comprising a roller member terminating at opposite ends and having a longitudinal passageway extending between and through said ends, at least a portion of said passageway forming a radially inwardly facing cylindrical surface of substantially uniform diameter, drive means for imparting rotational movements to each of said power rollers, said drive means comprising a drive shaft rotatably mounted on said frame and extending through and beyond the ends of the passageway of an associated power roller, a friction drive member mounted on said drive shaft and positioned in said passageway portion, co-acting means on said drive shaft and on said friction drive member providing for the conjoint rotational movement of said drive shaft and said friction drive member, said friction drive member having a generally cylindrical outer surface of substantially uniform diameter which is sufficiently less than the diameter of said cylindrical surface in said passageway to provide for a space between the bottom sides of said cylindrical surfaces when the top sides thereof are in frictional engagement, said friction drive member being frictionally engaged with said roller member to transmit the rotational movement of said drive shaft to said roller member to propel the articles along said conveyor, said friction drive member being formed of a powdered metal and being impregnated with a lubricating agent enabling said friction drive member to slip in said passageway relative to said roller member when an article on said roller member is restrained from movement.

2. The conveyor according to claim 1 wherein said lubricating agent is a liquid which expands in response to heat generated by slipping of said friction drive member in said roller member, said liquid being contained in said drive member in sufficient quantity to provide, when expanded, lubrication at the interface between said friction drive member and said roller member and reducing the generation of additional heat.

3. The conveyor according to claim 2 further including means forming a shoulder at one end of said passageway portion, and at least one cap member removably mounted on said roller member so as to project into said passageway portion, said friction drive member being retained between said cap member and said shoulder.

* * * * *